Dec. 5, 1967                          C. L. FARRAND                          3,356,932
                         POSITION MEASURING TRANSFORMER HAVING COIL
                                   WINDING FOR SALIENT POLES
Filed March 31, 1964                                                   3 Sheets-Sheet 1
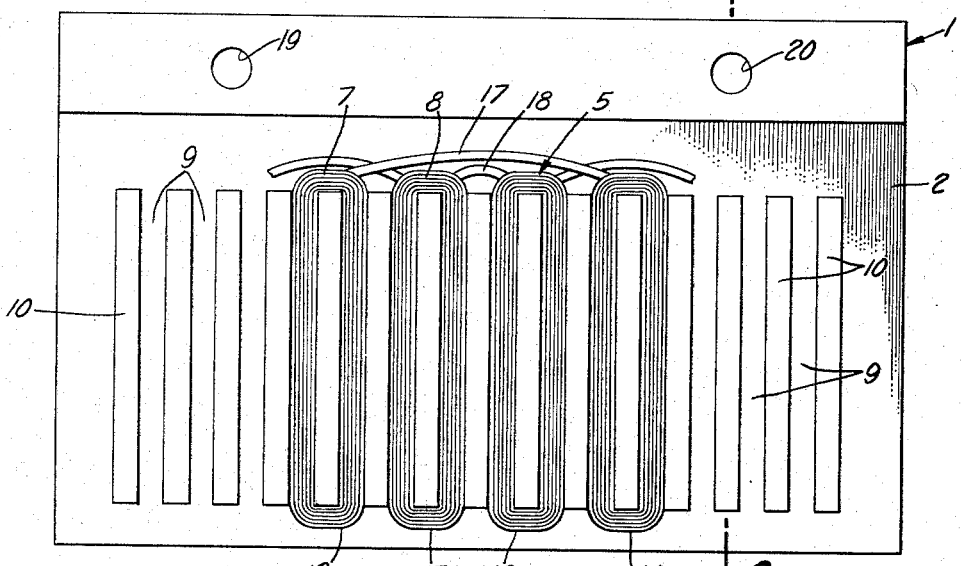
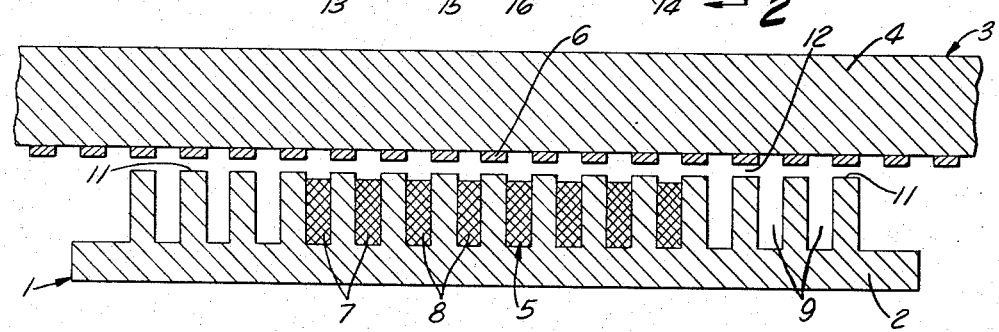
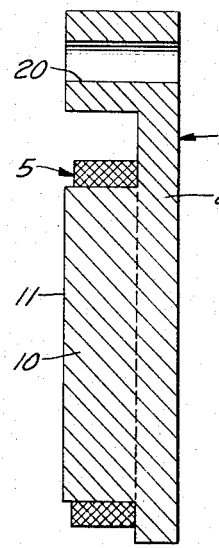
INVENTOR.
CLAIR L. FARRAND
BY W. E. Beatty
ATTORNEY Dec. 5, 1967 C. L. FARRAND 3,356,932
POSITION MEASURING TRANSFORMER HAVING COIL
WINDING FOR SALIENT POLES
Filed March 31, 1964 3 Sheets-Sheet 2

INVENTOR.
CLAIR L. FARRAND
BY
W E Beatty
ATTORNEY

Dec. 5, 1967     C. L. FARRAND     3,356,932
POSITION MEASURING TRANSFORMER HAVING COIL
WINDING FOR SALIENT POLES
Filed March 31, 1964     3 Sheets-Sheet 3
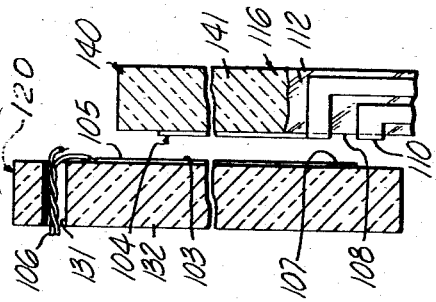
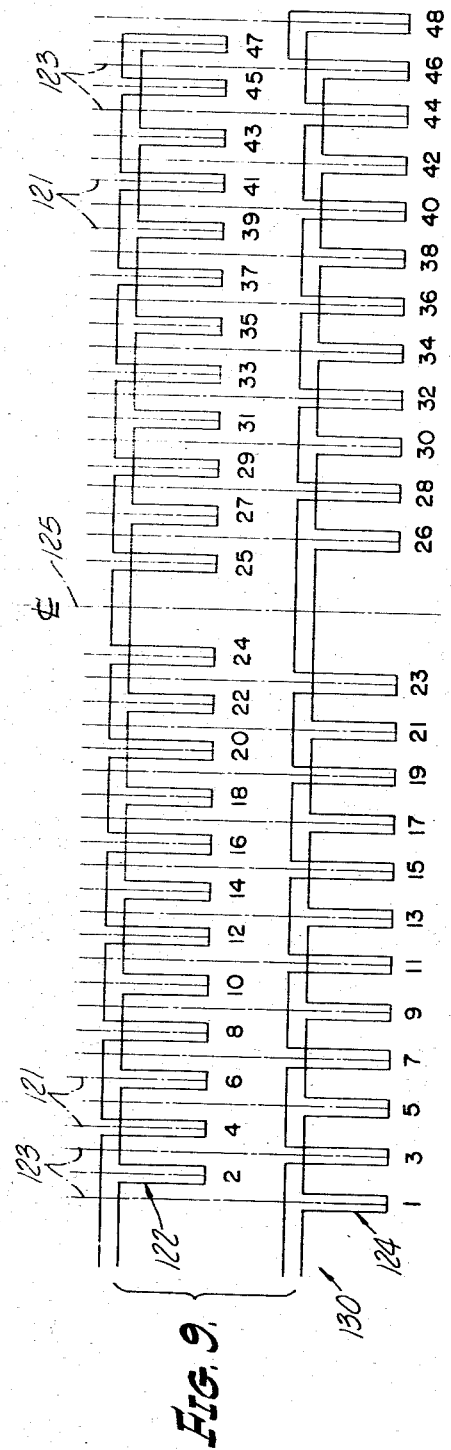
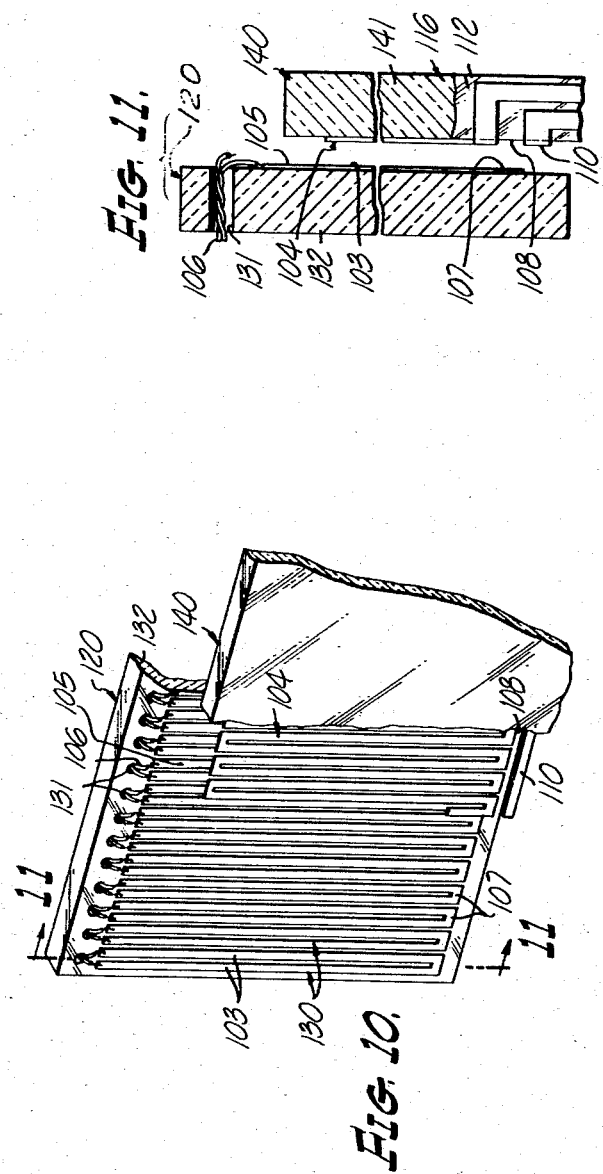
CLAIR L. FARRAND
INVENTOR
BY
ATTORNEY 3,356,932
POSITION MEASURING TRANSFORMER HAVING COIL WINDING FOR SALIENT POLES
Clair L. Farrand, Bronxville, N.Y., assignor to Inductosyn Corporation, Carson City, Nev., a corporation of Nevada
Filed Mar. 31, 1964, Ser. No. 356,210
3 Claims. (Cl. 323—51)

ABSTRACT OF THE DISCLOSURE

The transformer includes a first member inductively related and movable relative to a second member. The first member has a continuous winding of series connected and uniformly spaced conductors. The second member has a plurality of windings which are displaced from each other by a fraction of the spacing of the winding of the first member whereby voltages are induced in the plurality of windings in the same time phase but in different space phases. Each phase of the winding of said second member comprises a plurality of coils each surrounding one of said salient poles with the sides of each coil in the respective slots at the opposite sides of the salient pole. A coupling between the windings of the second member compensates for faulty geometrical spacing of the windings and a gain adjustment equalizes the voltages inductively coupled from the winding of the first member to the plurality of windings of the second member.

This invention relates to Position Measuring Transformers of the type disclosed in U.S. Patent No. 2,799,835, and particularly to transformers using ferrous metals although nonferrous metals may be used without departing from the spirit of the invention.

Transformers of this type employ relatively movable members, where the first member has a single winding of serially connected adjacent conductors positioned normal to the direction of motion of the member and wherein the current in adjacent conductors flows in opposite directions.

The second member employs two windings similar to the windings of the first member in geometrically spaced phase relation to the width of the conductors, the space between them and the pitch of the conductors are proportioned to reduce harmonics of the fundamental conductor frequency.

The windings are sometimes grouped and connected to minimize the effects of eccentricity and wobble as well as undesired couplings of the winding of one member to the windings of the other member.

In the case of linear position measuring transformers, it is also known to position the groups of conductors of the polyphase windings symmetrically with respect to the center line of the windings.

Summary

The present invention takes advantage of the fact that the first member establishes the accuracy of the transformer, and that certain tolerances are permissible in the construction of the second member. The invention provides an improved form of the second member, which obtains a large increase in output without sacrificing accuracy of measurement. An accurate position measuring transformer could not be made wherein both the first and second members are made by machining the conductors or slots into which the conductors could be imbedded. However, in accordance with this invention, while the first member is produced by the prescribed accurate methods, the second member is produced by the less accurate method involving machining slots in the base member and inserting the windings in the slots. Notwithstanding the inaccuracies of the positions of the slots, the member is corrected by suitable adjustments as follows, (a) the trigonometrical relation of the windings is adjusted by suitable coupling resistance or other form of coupling, (b) the equality of coupling of the several phases to the first member is corrected by gain adjustments.

A further advantage of this invenhtion is that the improved results are obtained with a reduction in cost of production. Whereas, for example, the windings of the second member, as shown in U.S. Patent No. 3,064,218, patented Nov. 13, 1962, require extensive labor in interconnecting and soldering individual slider windings, by the present invention, the interconnecting and soldering is eliminated.

A further economy of manufacture is accomplished by molding the metallic base member of powdered magnetic metal.

The output voltage of position measuring transformers of this type is proportional to the square root of the volume of the conductors of the second member. The table below shows a volume ratio of 26 to 1 and an output ratio of 5 to 1 in favor of the present invention. It is usual to etch or deposit the conductor in a copper sheet .002 inch thick. By the present invention, this copper is removed from the air gap 12 in FIG. 3, increasing the output further by approximately 20 percent. As an example, a comparison of a position measuring transformer having a cycle length of .200 inch made by former methods and by the present invention is shown by the following table wherein the units of measurements are "inches."

| Winding | Cycle length | Pole and slot widths | Slot depth | Thickness | Width | Area ×10⁻³ | Volume ratio | Output ratio |
|---|---|---|---|---|---|---|---|---|
| Etched | .200 | .05 | .05 | .002 | .05 | .1 | 1/1 | 1/1 |
| Wound | .200 | .05 | .075 | .065 | .04 | 2.6 | 26/1 | 5/1 |

For further details of the invention, reference may be made to the drawings wherein:

FIG. 1 is a plan view of a salient pole slider according to the present invention.

FIG. 2 is a sectional view on line 2—2 of FIG. 1.

FIG. 3 is a longitudinal sectional view of the slider of FIG. 1, with a superposed scale or relatively stationary member.

FIG. 9 is a schematic view of a wiring pattern for the quadrature windings of the slider.

FIG. 10 is a perspective view of the scale and its continuous winding of FIG. 3 with a slider winding the electrical equivalent of the slider of FIGS. 1–3.

FIG. 11 is an enlarged sectional view on line 11—11 of FIG. 10, looking in the direction of the arrows and with parts broken away.

Figure 4:
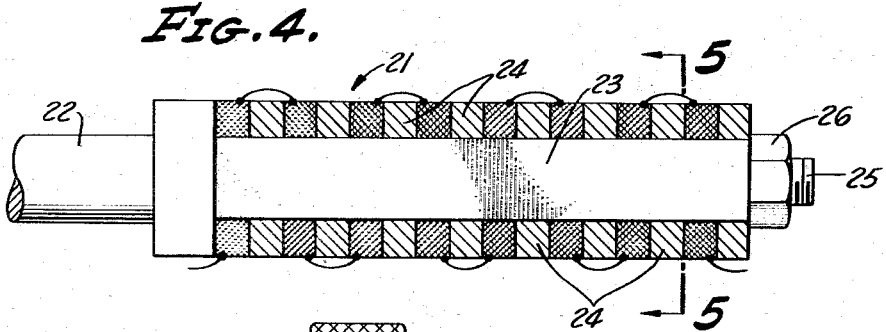
FIG. 4 is a view, partly in section, of a coil forming device for forming the coils for each phase of the slider.
Figure 5:
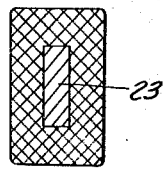
FIG. 5 is a sectional view on line 5—5 of FIG. 4.

Referring in detail to the drawings, in FIGS. 1–3 the slider 1 has a base or support 2 and the scale 3 has a base or support 4 for their respective windings 5 and 6. The bases 2 and 4 are of metal, preferably of hot rolled steel, as described and claimed in copending application S.N. 852,028, filed by applicant Nov. 19, 1959, for Precision Transducer, now Patent 3,202,948, Aug. 24, 1965. The winding 6 of the scale 3 is an accurate, etched winding, whereas the winding 5 of the slider is a polyphase winding here shown as 2 phases 7 and 8 in space quadrature of the pole cycle of the single phase winding 6. Winding 6 has parallel conductor portions connected in series to form a continuous winding and corresponds to scale winding 4 in U.S. Patent 3,064,218, referred to above. The base 2 of this invention has apertures indicated at 19 and 20 for attachment to a movable machine member. The scale 4 of this invention, for example, is in the form of units each 10 inches long, fixed to the stationary part of the machine and in sufficient number for the length of machine movement to be controlled.

The slider base 2, in the linear form shown, has a series of parallel equally spaced slots indicated at 9, providing a series of parallel salient poles indicated at 10. The outer ends 11 of the salient poles 10 are in close space relation to the scale winding 6, the absence of a winding on the pole faces 11 making it possible to reduce the air gap 12 between the scale and the slider with increase in voltage output as pointed out above. Each phase 7 and 8 of the slider winding 5 is in the form of a series of coils laid in the slots 9, for example, 2 coils 13 and 14 being shown for one phase 7 and coils 15 and 16 being shown for the other phase 8.

The coils of each phase 7 and 8 have interconnections indicated respectively at 17 and 18 to provide a pattern or spacing of the active conductor portions as described and claimed in connection with FIG. 2 of U.S. Patent 2,915,722, issued Dec. 1, 1959, to V. F. Foster.

In FIG. 3 of the Patent 2,915,722, each active conductor portion like 30, 31, consists of a single conductor strip located above the surface of its support or base, whereas according to the present invention, each corresponding active conductor portion consists of a number of turns of wire forming one side of a coil located below the surface of its support, each coil surrounding a salient pole, the pole faces 11 forming one side of the air gap between the transformer members 1 and 3.

The salient poles 10 and the sides of their windings 13 to 16 extend transversely of the direction of relative movement of the slider 1 and scale 3.

As in Patent 2,915,722, each phase may have 8 sectors or coils, the center to center distance of the coils being the same as the center to center distance of the sectors 1 to 16 in FIG. 2 of the patent, with the coils so connected as to be balanced about the same center line like 50 in the patent.

As shown in FIG. 3 herein, the spacing of the salient poles 10 and of the sides of the coils 13 to 16 is the same as the spacing of the active conductors of the scale winding 6.

While the invention is not limited to any particular method of forming the coils for the phases 7 and 8, for example, use may be made of the coil former 21 in FIG. 4. Coil former 21 is in the form of a spindle having an inner end 22 mounted in the chuck of a lathe, or the like, and having a rectangular outer end or core 23 having suitable parallel spacers indicated at 24. The outer end of core 23 has threads 25 for a removable retaining nut 26. Each section of the winding is built up or formed as the coil former 21 is rotated.

Figure 6:
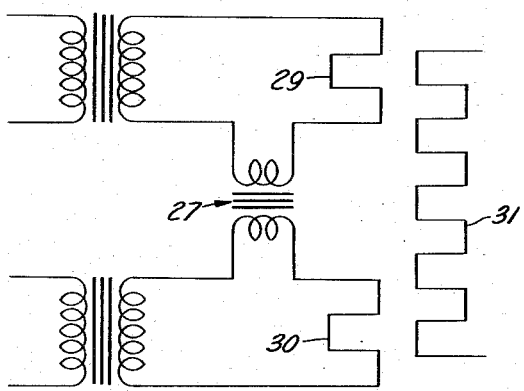
FIGS. 6 and 7 are circuit diagrams showing different ways for adjusting the coupling between the phases of the slider to adjust the trigonometrical relation of the windings.

The proper quadrature relation between the phases of the slider winding in the case of 2 phases as shown, or the proper relation between the geometrical spacing of the phases and the trigonometrical input in the case of a different number of phases is obtained by accurate geometrical spacing of the windings or by coupling between the phases, if necessary, so that the electrical angular spacing of the phases corresponds to the relevant trigonometrical functions. This coupling may be in the form of an inductive coupling 27 in FIG. 6, or a resistance coupling 28 in FIG. 7.

Gain

Equality of couplings between windings 29 and 31, and 30 and 31, is dependent upon current in 29 and 30. Assuming identical sources of alternating voltage, then equal current will be maintained in 29 and 30, if the circuit impedance values are equal. This is accomplished by variable resistor 32 which adjusts the impedance value of its circuit, including winding 29, to equal that of resistor 33 and winding 30.

Cross coupling

Figure 7:
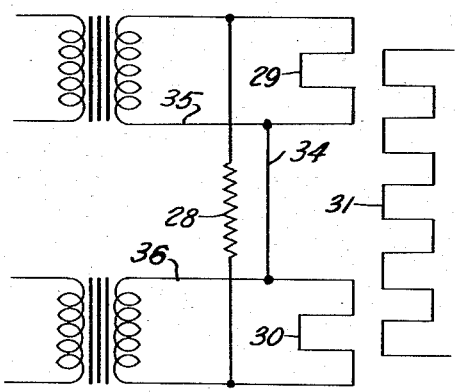

The electrical angular spacing of the phases may be brought to correspondence with the predetermined trigonometrical function by coupling currents between the two phases of the second member. Referring to FIG. 7, part of the current in winding 29 is caused to flow in 30 by resistor 28. Correspondingly, part of the current in 30 is also caused to flow in 29. A connection 34 is provided between the lower connection 35 of winding 29 and the upper connection 36 of winding 30 to complete the cross coupling circuit.

The resistance value of 28 determines the amount of current taken from one winding to the other. The rates of the resistance values of 30 to 28 will determine the proportion of current drawn from 29. Likewise, the ratio of the resistance values of 29 to 28 will determine the proportion of current drawn from 29.

The "ratio of values" described above approximately correspond to the tangent of the angular correction needed to obtain the predetermined trigonometrical function.

Figure 8:
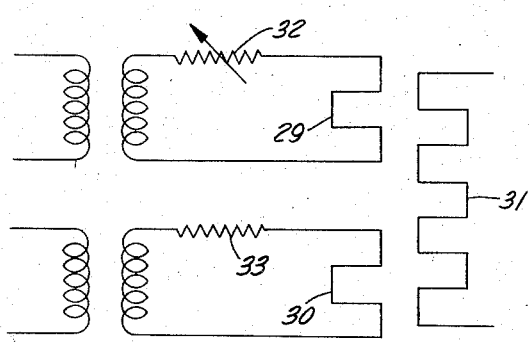
FIG. 8 is a circuit diagram illustrating a gain adjustment for the polyphase windings of the slider to obtain equality of coupling of the several phases of the slider winding to the scale winding.

The equality of the coupling of the polyphase windings 29 and 30 to the scale winding 31 is corrected by the gain adjustments 32, 33 in circuit with the polyphase windings 29, 30 in FIG. 8.

FIG. 10 illustrates generally the physical relationship, although not to scale, of one embodiment of the conductors of the slider 1 and scale 3 shown in FIG. 3. For clarity, the thickness of the conductors has been exaggerated in FIGS. 10 and 11. FIGS. 10 and 11 also illustrate the manner in which the leads to the conductor sections of the quadrature windings are assembled. The leads are tightly twisted to reduce the effect of stray magnetic fields.

In FIGS. 10 and 11, the member 120 is a slider and corresponds to the slider 1 of FIG. 1. It comprises a base 132 having two windings in space quadrature of the pole cycle of the continuous winding member 140. Member 140 corresponds to the scale 3 of FIG. 3 and is fastened to the machine bed. The continuous winding member 140 establishes the pole cycle within which a position is measured by the transformer and which, therefore, may be called the scale or scale member. A pole cycle is equivalent to two poles or conductors. The pole cycle of the continuous winding member, for example, may be 0.1 inch. When fixed, such a continuous winding member constitutes a reference to which the position of slider member 120 may be referred. The scale member usually has been of the order of 10″ in length and the slider member has been of the order of 5″ in length. A plurality of scale members may be combined to permit measurement of position over a desired distance.

In FIG. 10, the scale member 140 comprises a base 141 having a plurality of parallel, equally spaced series connected active conductors 104 which form a continuous winding. Electrical connections may be made at the terminations of conductors 104 and the conductor 110.

The slider winding 130 comprises the quadrature windings 122 and 124, each having groups as indicated in FIG. 9. The groups of one quadrature winding are interdigitated with the groups of the other quadrature winding, as shown in FIG. 9. Each group in FIGS. 9–11 comprises two parallel conductors 103, each forming an electrical pole. The conductors are connected by end turns 107 opposite space 108 on scale 140.

Slider 120 has a base 132 pierced with a hole 131 for each conductor group of the slider winding. The leads to the conductor groups are brought out, as shown in FIG. 11, where leads are illustrated as tightly twisted together. Lead-in conductor 110 is shown in FIG. 11 as extending around the edge 112 of scale section 116. The interconnection of conductor groups of the quadrature windings 122 and 124 of slider winding 130 is schematically illustrated in FIG. 9.

In FIGS. 10 and 11, terminals 105 are connected together in series by means of twisted leads as indicated in 106.

Advantageously, the conductor groups of the two quadrature windings 122, 124 of FIG. 9 may be preassembled to produce the two windings of the transformer member illustrated in FIG. 1 as windings 7 and 8. Center lines 121 for the conductor groups of the winding 122 show the center-to-center spacing for that winding. Center lines 123 show the center-to-center spacing of the conductor groups of the winding 124.

FIG. 9 also shows that each of the windings 122, 124 is balanced about the same center line CL125 so that any growth or shrinkage of the scale has the same effect on both windings, since the center line of both is the same. It should be noted that in FIG. 9, the adjacent groups, numbered 1 to 48, total 48 in all and are still in space quadrature with their neighbors, with the exception of the center two groups 24 and 25, which are in phase in space, being a whole number of poles apart.

As previously noted, the pole cycle of the scale winding, like winding 6 of FIG. 3, is 0.1", which represents 360 electrical degrees, and of which ¼ is 0.025", representing 90 electrical degrees. The center-to-center spacing, namely, the distance between a center line 121 of one group and the adjacent center line 123 of an alternate group is 0.075", which is an odd multiple of the abovementioned quadrature value, whereby the quadrature relation is established between the windings 122 and 124 in a typical case representative of FIG. 9. FIG. 9 is typical of the quadrature relation between the windings 7 and 8 in FIG. 1. In other words, the value 0.1" represents 360 electrical degrees, whereby the value 0.025" and its odd harmonic 0.075" represent 90 electrical degrees of a quadrature relation between the windings 122 and 124 with respect to the pole cycle of the scale winding like 6 in FIG. 3. The value 0.025" is too small for practical purposes, and, hence, an odd harmonic such as 0.075" is chosen for the value of the spacing which gives the quadrature relation between the windings.

Groups 2, 4, 6, 8, 10, 12, 14, 16, 18, 20, 22, 24, 25, 27, 29, 31, 33, 35, 37, 39, 41, 43, 45, and 47 comprise one of the quadrature windings 122, connected as shown. Groups 1, 3, 5, 7, 9, 11, 13, 15, 17, 19, 21, 23, 26, 28, 30, 32, 34, 36, 38, 40, 42, 44, 46, and 48 comprise the other quadrature winding 124, connected as shown.

The interconnection of the groups of quadrature windings 122, 124, as indicated, retains the ability to reject the effects of one turn loop coupling and to reject the effects of non-parallelism of patterns as well as the ability to eliminate effects of capacitance coupling.

As shown in FIG. 10, the U-shaped groups or sectors of the slider winding 130 have parallel conductor portions 103 causing current, therefore, to flow in opposite directions in the conductors of each pair.

I claim:

1. A position measuring transformer comprising first and second relatively movable inductively related transformer members each having a winding separated by an air gap, each of said windings comprising a plurality of conductors disposed side by side and connected in series for opposite directions of current flow in adjacent conductors, the winding of said first member having a certain uniform spacing, the winding of said second member comprising a plurality of windings displaced from each other by a fraction of said spacing to form a plurality of phases in which the voltages are induced in the same time phase but displaced in space phase, the winding of said second member having a support having a series of slots and salient poles extending transversely of the direction of relative movement of said members, each phase of the winding of said second member comprising a plurality of coils each surrounding one of said salient poles with the sides of each coil in the respective slots at the opposite sides of the salient pole, said salient poles having faces forming one side of the air gap between said transformer members.

2. A position measuring transformer according to claim 1, said windings of said second member each having a circuit for coupling induced voltages between said windings of said second member to compensate for faulty geometrical spacing of said last-mentioned windings to make the electrical angular spacing thereof correspond to the relevant electrical trigonometrical function.

3. A position measuring transformer according to claim 1, said windings of said second member each having a circuit, including a gain adjustment to equalize the inductive coupling from the winding of said first member to said windings of said second member.

References Cited

UNITED STATES PATENTS

| | | | |
|---|---|---|---|
| 2,650,352 | 8/1953 | Childs | 318—20.73 |
| 2,864,992 | 12/1958 | Fredrickson | 323—52 X |
| 3,064,218 | 11/1962 | Farrand | 336—129 |
| 3,099,830 | 7/1963 | Wayman | 340—196 X |

JOHN F. COUCH, *Primary Examiner.*

WARREN E. RAY, *Examiner.*

A. D. PELLINEN, *Assistant Examiner.*